United States Patent [19]

Poll

[11] Patent Number: 4,814,416
[45] Date of Patent: Mar. 21, 1989

[54] MOLDING COMPOUNDS COMPRISED OF A THERMOTROPIC AROMATIC POLYESTER

[75] Inventor: Heinz-Guenter Poll, Hilden, Fed. Rep. of Germany

[73] Assignee: Huels Aktiengesellschaft, Marl, Fed. Rep. of Germany

[21] Appl. No.: 189,708

[22] Filed: May 3, 1988

[30] Foreign Application Priority Data

Sep. 4, 1987 [DE] Fed. Rep. of Germany ....... 3729679

[51] Int. Cl.$^4$ .............................................. C08G 63/60
[52] U.S. Cl. ..................................... 528/173; 528/193
[58] Field of Search ................................ 528/173, 193

[56] References Cited

U.S. PATENT DOCUMENTS

| | | | |
|---|---|---|---|
| 3,637,595 | 5/1969 | Cottis et al. | 260/47 C |
| 4,600,764 | 7/1986 | Dicke et al. | 528/128 |
| 4,614,789 | 9/1986 | Dicke et al. | 528/128 |
| 4,731,432 | 3/1988 | Portugall | 528/190 |
| 4,748,229 | 5/1988 | Hisgen et al. | 528/183 |

*Primary Examiner*—Maurice J. Welsh
*Assistant Examiner*—L. Henderson
*Attorney, Agent, or Firm*—Oblon, Fisher, Spivak, McClelland & Maier

[57] ABSTRACT

A thermotropic aromatic polyester molding compound, comprising:
(A) 10–80 mol % p-Hydroxybenzoic acid;
(B) 10–45 mol % HOOC-Ar-COOH;
(C) 0–43 mol % HO-Ar'-OH, where Ar and Ar' are, independently, 1,3- or 1,4-phenylene; 1,4-, 1,5-, 2,6- or 2,7-naphthalene; or

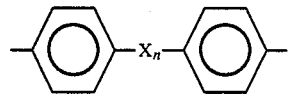

wherein X is —O—, —S—, —SO$_2$, —CR$_2$—; n is 0 or 1 and R is H or C$_{1-4}$ alkyl; and
(D) 2–45 mol %

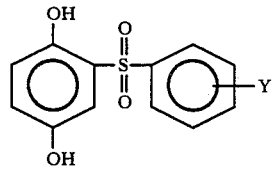

wherein Y is —H, —R, —OR, —Ar'', or —OAr'', where Ar'' is a monovalent aromatic group; and
wherein the molar ratio B/(C+D) is in the range 0.9:1 to 1.1:1.

14 Claims, No Drawings

MOLDING COMPOUNDS COMPRISED OF A THERMOTROPIC AROMATIC POLYESTER

BACKGROUND OF THE INVENTION

1. Field of the Invention

The present invention relates to molding compounds comprised of a thermotropic aromatic polyester.

2. Discussion of the Background

Thermotropic aromatic polyesters comprised of units of terephthalic acid, isophthalic acid, p-hydroxybenzoic acid, and bisphenols are known (Ger. OS No. 20 25 971). The melting points of the polyesters described are generally >300° C., and some are >400° C. Such polyesters are difficult to process.

Polyesters with improved processibility contain, in addition to the known starting monomers, other units such as, for example, benzophenone dicarboxylic acid (Ger. OS No. 34 27 886) or dihydroxybenzophenone (Ger. OS No. 34 15 530). However, molded parts produced according to these references have poor shape retention when heated.

SUMMARY OF THE INVENTION

Accordingly, one object of the invention is to provide a polyester molding compound and to reduce the melting temperature of the polyester while simultaneously increasing the shape retention of the molding compound when heated. The latter property is measured as Tg, the glass temperature.

This and other objects which will become apparent from the following specification have been achieved by the polyester molding compounds of the present invention which comprises:

(A) 10–80 mol% p-Hydroxybenzoic acid;
(B) 10–45 mol% HOOC-Ar-COOH;
(C) 0–43 mol% HO-Ar'-OH, where Ar and Ar' are, independently, 1,3- or 1,4-phenylene; 1,4-, 1,5-, 2,6- or 2,7-naphthalene; or

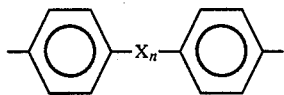

wherein X is —O—, —S—, —SO$_2$—, or —CR$_2$—; n is 0 or 1 and R is H or C$_{1-4}$ alkyl; and
(D) 2–45 mol%

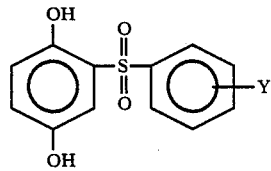

wherein Y is —H, —R, —OR, —Ar'', or —OAr'', where Ar'' is a monovalent aromatic group; and wherein the molar ratio B/(C+D) is in the range 0.9:1 to 1.1:1.

DETAILED DESCRIPTION OF THE PREFERRED EMBODIMENTS

The present invention provides thermotropic aromatic polyester molding compounds which comprise p-hydroxybenzoic acid (component A), an aromatic dicarboxylic acid (component B) and a 2,5-dihydroxydiphenylsulfone (component D). The molding compounds may optionally contain an aromatic dihydroxy compound (compound C) if desired.

Preferably the amount of component A (p-hydroxybenzoic acid) used in 30–70 mol%.

The aromatic dicarboxylic acids of component B are preferably isophthalic acid, terephthalic acid, 1,4-, 1,5-, 2,6-, or 2,7-napthalenedicarboxylic acid, 4,4'-diphenyl ether dicarboxylic acid, or 4,4'-benzophenonedicarboxylic acid, or mixtures thereof.

The aromatic dihydroxy compounds (compound C) are preferably hydroquinone, resorcinol, 1,3-, 1,4-, 1,5-, 2,6-, or 2,7-dihydroxynaphthalene, 4,4'- or 3,4'-dihydroxybiphenyl, 4,4'- or 3,4'-dihydroxydiphenyl ether, 4,4'-dihydroxydiphenyl sulfone, or mixtures thereof.

Preferred examples of component D include 2,5-dihydroxydiphenyl sulfone, 2,5-dihydroxy-4'-methyldiphenyl sulfone, 2,5-dihydroxy-4'-phenyldiphenyl sulfone, and mixtures thereof.

Particularly preferred compounds are iso- and/or terephthalic acid (compound B), hydroquinone or 4,4'-dihydroxybiphenyl (compound C), and 2,5-dihydroxydiphenyl sulfone (compound D).

The component B is preferably employed in amounts of 15–35 mol%, the component C in amounts of 10–30 mol%, and component D in amounts of 5–35 mol%.

In a particularly preferred embodiment, polymers are employed in which the molar ratio of component C to component D is in the range 4:1 to 1:1. The molar ratio of B to (C+D) is preferably in the range 0.9:1 to 1.1:1.

Unless expressly stated otherwise, the amounts given for the individual components are on the basis of the sum (A+B+C+D). Accordingly, the sum of the amounts of all the components must equal 100 mol%.

The polyesters preferably have a reduced viscosity ($\eta_{red}$) of at least 1.0 dl/g, preferably at least 2.0 dl/g.

The preparation of thermotropic aromatic polyesters is known and the polyesters of the present invention may be prepared by these known methods. See 1974 Polymer, 15, 527 and 1986 Polymer, 27, 441.

The reaction proceeds in two steps. The first step is a transesterification or esterification. The second step is a polycondensation, which may be carried out in the absence or presence of catalysts.

When catalysts are used, the amount of catalyst is 0.001–0.5 wt.%, preferably 0.01–0.1 wt.% based on the sum of the monomers. Suitable catalysts are, e.g., alkali acetates, alkaline earth acetates, zinc acetate, manganese acetate, germanium dioxide, antimony trioxide, organotin compounds, and titanium- and zirconium alcoholates. The catalysts are per se known, and are described in, e.g., Korshak, V. V., and Vinogradova, S., 1965, "Polyesters", pub. Pergamon Press.

The polyesters may contain known branching agents, e.g., trimesic acid, pyromellitic acid, or a trihydroxybenzene.

The methods of producing the molding compounds are known in the art. Thus, for example, the polyester may be melted in an injection molding machine and injection molded in a mold.

The molding compounds may contain, in addition to the thermotropic aromatic polyester, customary additives such as pigments, UV stabilizers, antioxidants, other stabilizers, fillers, etc.

The molding compounds may be processed to produce molded parts, fibers, films, etc., by customary methods such as injection molding, extrusion, etc.

The inventive polyesters have surprisingly high glass temperatures, and accordingly have unexpectedly good shape retention under heating. At the same time they have low melting points, whereby they can be processed at low temperatures in comparison to known polyester molding compounds.

The reduced viscosity ($\eta_{red}$) is determined in a solution of the polyester in pentafluorophenol (0.1:100 parts of weight) at 60° C. Even if a polyester is insoluble in the solvent due to the polyester's high molecular weight, its reduced viscosity will still be within the claimed range.

Tg and Tm are determined by DSC (differential scanning calorimetry) at a heating rate of 10° C./min.

Other features of the invention will become apparent in the course of the following descriptions of exemplary embodiments which are given for illustration of the invention and are not intended to be limiting thereof.

EXAMPLES

Experiment 1

A mixture comprised of 8.3 g (0.05 mol) terephthalic acid, 12.5 g (0.05 mol) 2,5-dihydroxydiphenyl sulfone, 13.8 g (0.10 mol) 4-hydroxybenzoic acid, and 30.6 g (0.3 mol) acetic anhydride was heated to 260° C. under nitrogen. After 15 min at 260° C., the mixture was maintained 15 min each at 280° C., 300° C., and 320° C., in succession, wherewith the acetic acid and excess anhydride distilled off. Then a vacuum (<0.1 mbar) was applied for 1 hr. in order to complete the removal of acetic acid.

The polyester obtained had a glass temperature, Tg, of 162° C., and a melting point, Tm, of 289° C. The reduced specific viscosity ($\eta_{red}$) was 5.44 dl/g. In a polarization microscope, above the melting point the polyester showed a Schlieren pattern typical of liquid crystalline compounds.

Experiments 2-5

The compositions and properties of the polyesters of Experiments 2-5 are summarized in the Table. These polyesters were prepared analogously to the polyester of Experiment 1.

TABLE

| Experiment | Composition of the polyester (mol) | Tg (°C.) | Tm (°C.) | $\eta_{red}$ (dl/g) |
|---|---|---|---|---|
| 1 | PHB:TS:DHSO 2:1:1 | 162 | 289 | 5.44 |
| 2 | PHB:TS/IS:DHSO 1:0.5/0.5:1 | 169 | 254 | >1* |
| 3 | PHB:TS/IS:DHSO/HC 1:0.5/0.5:0.5/0.5 | 168 | 252 | >1* |
| 4 | PHB:TS:DHSO 1:1:1 | 170 | 266 | 4.74 |
| 5 | PHB:TS/IS:DHSO/DHB 2:0.5/0.5:0.5/0.5 | 170 | 255 | 2.31 |

PHB = 4-hydroxybenzoic acid
TS = terephthalic acid
DHSO = 2,5-dihydroxydiphenyl sulfone
HC = hydroquinone
IS = isophthalic acid
DHB = 4,4'-dihydroxybiphenyl
*Insoluble in pentaflrorophenol due to high molecular weight.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermotropic aromatic polyester molding compound, comprising:
   (A) 10-80 mol% p-Hydroxybenzoic acid;
   (B) 10-45 mol% HOOC-Ar-COOH;
   (C) 0-43 mol% HO-Ar'-OH, where Ar and Ar' are, independently, 1,3- or 1,4-phenylene; 1,4-, 1,5-, 2,6- or 2,7-naphthalene; or

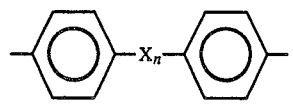

wherein X is —O—, —S—, —SO$_2$, or —CR$_2$—; n is 0 or 1 and R is H or C$_{1-4}$ alkyl; and
   (D) 2-45 mol%

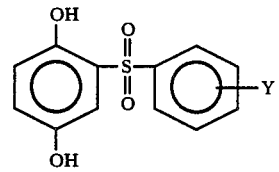

wherein Y is —H, —R, —OR, —Ar'', or —OAr'', where Ar'' is a monovalent aromatic group; and wherein the molar ratio B/(C+D) is in the range 0.9:1 to 1.1:1.

2. The molding compound according to claim 1, comprising 15-35 mol% of component B.

3. The molding compound according to claim 1, comprising 10-30 mol% of component C.

4. The molding compound according to claim 1, comprising 5-35 mol% of component D.

5. The molding compound according to claim 1, wherein component B is selected from the group consisting of isophthalic acid; terephthalic acid; 1,4-, 1,5-, 2,6-, and 2,7-naphthalenedicarboxylic acid; 4,4'-diphenyl ether dicarboxylic acid; 4,4'-benzophenone dicarboxylic acid, and mixtures thereof.

6. The molding compound according to claim 1, wherein compound C is selected from the group consisting of hydroquinone; resorcinol; 1,3-, 1,4-, 1,5-, 2,6-, and 2,7-dihydroxynaphthalene; 4,4'- and 3,4'-dihydroxybiphenyl; 4,4'- and 3,4'-dihydroxydiphenyl ether; 4,4'-dihydroxydiphenyl sulfone; and mixtures thereof.

7. The molding compound according to claim 1, wherein component D is selected from the group consisting of 2,5-dihydroxydiphenyl sulfone, 2,5-dihydroxy-4'-methyldiphenyl sulfone; 2,5-dihydroxy-4'-phenyldiphenyl sulfone; and mixtures thereof.

8. The molding compound according to claim 1, wherein Ar is 1,3- or 1,4-phenylene, or a mixture thereof.

9. The molding compound according to claim 1 wherein Ar' is 1,4-phenylene or 4,4'-biphenylene, or a mixture thereof.

10. The molding compound according to claim 1, wherein component D is at least 20 mol% of the sum of components C and D.

11. The molding compound according to claim 1, wherein component D is at least 30 mol% of the sum of components C and D.

12. The molding compound according to claim 1, wherein said polyester has a reduced viscosity ($\eta_{red}$) of at least 1.0 dl/g.

13. The molding compound according to claim 1, wherein component D is 2,5-dihydroxydiphenyl sulfone.

14. The molding compound according to claim 1, wherein the molar ratio of component C to component D is in the range 4:1 to 1:1.

* * * * *